INVENTOR.
PAUL E. OLSON
BY Ralph W. McIntire, Jr.
ATTORNEY

United States Patent Office 3,440,930
Patented Apr. 29, 1969

3,440,930
CUSHION SEAL DEVICE FOR POWER CYLINDERS
Paul E. Olson, Lexington, Ky., assignor to Westinghouse Air Brake Company, Wilmerding, Pa., a corporation of Pennsylvania
Filed July 18, 1966, Ser. No. 570,386
Int. Cl. F01b 7/04, 11/02
U.S. Cl. 91—396                                       7 Claims

ABSTRACT OF THE DISCLOSURE

A cushion seal device for power cylinders in which a two piece cushion seal is disposed in an annular groove in the wall of a cavity in a cylinder head, the cushion seal comprising an inner annular resilient seal member sealingly engageable with a piston boss and movable into sealing engagement with the inner wall of the annular groove to entrap air in the cylinder, and an outer metal member concentrically attached to the inner member and having portions of outer periphery engaging the location of the groove to center the cushion seal in the cavity and provide a flow path around the outer periphery through the outer wall of the groove to the cylinder, the outer diameter of the annular resilient seal member being less than the opening in the outer wall of the groove to eliminate contact of the annular resilient seal member with the outer wall of the groove.

---

Heretofore, cushion seal devices of the aforementiond type have comprised a variety of different annular members disposed for axial movement in a groove at the open end of a bore in the cylinder head so as to assume a coaxial relationship with a cylindrical member on the rod and piston assembly disposed to axially precede the piston, whereby upon insertion of the cylindrical member through the annular member and into the bore at the end of the piston stroke, the cushion seals move axially into engagement with the one wall of the groove to seal the cylinder bore from the cylinder head cavity and its associated supply-exhaust port to effect entrapment, in the cylinder bore, of the fluid ahead of the piston, and, so that at the beginning of the return piston stroke the annular cushion seal member responds to pressure in the cavity and return movement of the piston to open a path around or through the cushion seal from the cylinder head cavity to the cylinder bore permitting fluid under pressure to impinge directly on the piston face while the cylindrical member is being withdrawn from the bore. When the cushion seal effects the aforementioned entrapment of air in the cylinder bore, an adjustable needle valve device disposed in a passage communicating the cylinder bore with the cylinder head cavity passes fluid to the bore at a desired rate to permit cushioned engagement of the piston with the internal face of the cylinder head.

The aforementioned annular cushion seal members heretofore have taken a variety of forms constructed from either rigid or resilient material and have been disposed for either or both axial and radial shifting relationship with respect to the walls of the groove in which the annular member is disposed, the radial shifting effecting centering alignment of the annular member with respect to the piston boss at contact therebetween, and with the axial shifting thereof effecting the aforementioned engagement with one wall of the groove for seating at the end of the piston stroke, and the engagement with the opposite wall of the groove at the beginning of the return stroke to open a fluid pressure path through or around the annular seal and through or around the aforesaid opposite wall to the piston face.

Heretofore, when the annular seal has been constructed of rigid material, the sealing action is less efficient than that provided by a resilient material, moreover, the periphery of the member has carried specially formed grooves to provide fluid passage around the cushion seal to the cylinder bore. Where the annular member has been constructed of resilient material, the wall of the groove nearest the cylinder bore has been ported to pass fluid under pressure around the periphery of the annular member to the cylinder bore. Further where the annular cushion seal is radially shiftable for self-centering action with respect to the piston boss, and especially where composed of resilient material, the radial shifting action at each stroke provides wearing of the seal against the walls of the groove.

It is an object of the present invention to provide an axially movable annular cushion seal member of the type generally described above and having a new and simple structure cooperating with the walls of a groove in the cylinder head bore, and a cylindrical member on a rod and piston assembly, to provide a resilient cushion seal sealingly engageable with the cylindrical member at the end of the piston stroke, and at the same time provide a rigid durable outer periphery on the resilient seal disposing its resilient seal coaxially with the cylindrical member and cooperating with the bottom and wall of the groove to form a fluid passage open from the exhaust cavity around the periphery of the seal to the piston face at the beginning of a return piston stroke.

In the present invention, this object is achieved by disposing for axial movement in an annular groove in a cylinder head bore a cushion seal member comprising an annular resilient seal element having a perimetric groove therein, and a flat rigid annular support element concentrically disposed therewith and having its inner periphery tightly engaged in the groove to mutually attach the two elements. The perimeter of the support element is polygonal and has a maximum diameter substantially equal to the diameter of the annular cavity in which it is disposed, to thusly center the resilient seal element with respect to the bore in the cylinder head cylindrical member of the rod and piston assembly coaxially received therethrough at the end of the piston stroke. In addition, by virtue of the non-circular rigid perimeter, there is provided a fluid passage around the edge of the support member, between the open ends of a conventional snap iring forming one wall of the groove and into the cylinder bore to impinge upon the face of the piston at the beginning of the return piston stroke. The inner periphery of the seal element is axially tapered to provide a tight seal with the cylindrical member of the rod and piston assembly to effect immediate axial movement of the seal member into and out of sealing engagement with the groove wall farthest from the cylinder bore.

These and other objects will become more readily apparent in the following description, taken in conjunction with the drawing, in which.

Figure 1:
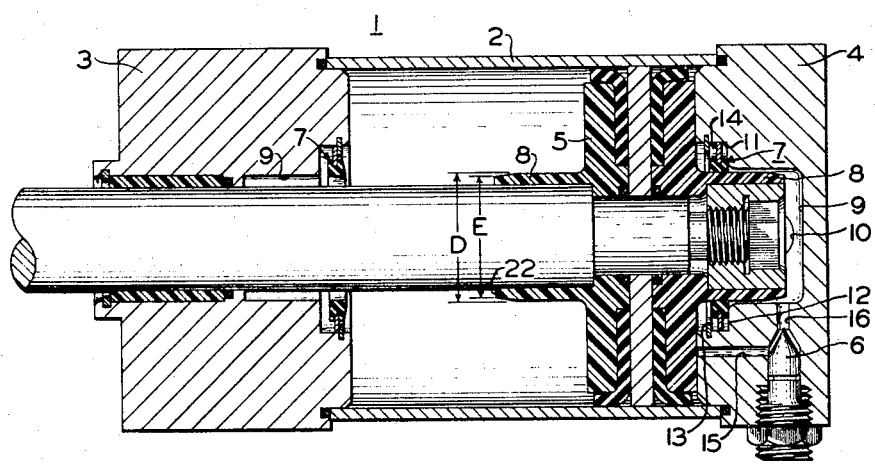
FIG. 1 is a sectional view of a power cylinder showing my invention.

Referring now to the drawing, and particularly FIG. 1 thereof, there is shown a power cylinder device generally indicated at 1 and comprising a cylinder body 2, a pair of cylinder heads 3 and 4 attached to opposite ends of the cylinder body by any suitable means, not shown, a rod and piston assembly 5 disposed in the cylinder body 2, a needle valve device 6 mounted in the cylinder head 4, and a cushion seal member generally indicated at 7 disposed in each cylinder head.

The particular structure of the cylinder body 2, cylinder heads 3 and 4, rod and piston assembly 5 and needle valve 6 do not form a part of the present invention and are shown as merely illustrative of commercially available counterparts. However, in general illustration of the environmental association of such structure with respect to the hereinafter described seal member 7, it will be observed that the piston assembly 5 includes thereon a pair of axially extending radially enlarged cylindrical members 8, each comprising a piston boss extendable at the end of the rod and piston stroke into a corresponding coaxially aligned cavity or bore 9 in each cylinder head, which bore is communicated with a combined supply-exhaust port 10, not shown in head 3. The bore 9 is provided with a counterbore or annular cavity 11, with the bottom of the counterbore forming the inner wall 12 of the cavity, and with a conventional snap ring 13 disposed in a groove of the cavity forming the outer limit of the cavity. The cylindrical member 8 may be an independent sleeve or an integral part of either the rod or piston. The wall 12, wall 13 and interconnecting wall 14 of cavity 11 collectively define a groove disposed in the wall of bore 9.

The hereinafter described seal member 7 is disposed in the cavity 11 to seal the cylinder bore from the head cavity 9 when the cylindrical member 8 enters cavity 9 at the end of its stroke, whereby the rod and piston assembly forces fluid under pressure through passages 15 and 16 to the head cavity 9 and exhaust port 10 at a rate determined by the adjustable needle valve device 6, thereby cushioning the end of the piston stroke. When fluid pressure is thereafter supplied through port 10 to cavity 9, the cylindrical member 8 and seal member 7 move to the left in response thereto, the seal member opening a passage therearound to pass fluid pressure to the piston of the piston assembly, in the manner now to be described.

Figure 2:
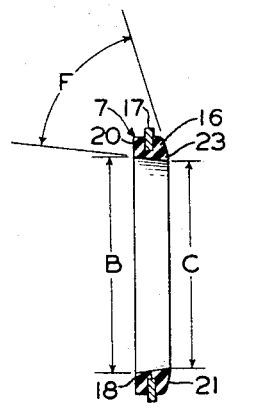
FIG. 2 is a cross-sectional view of the sealer member of FIG. 1, taken substantially along the line 2—2 of FIG. 3.
Figure 3:
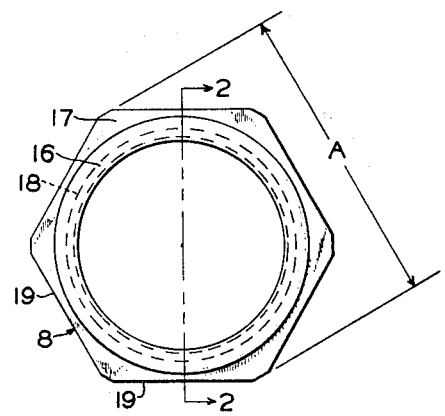
FIG. 3 is an end elevational view of the sealer member of FIG. 2.

In accordance with the present invention, the seal member 7, as shown in FIGS. 2 and 3, comprises an assembly of two elements, namely, an annular element 16 composed of any suitable rigid material, preferably metal. such as rubber, and a flat annular support element 17 composed of any suitable rigid material, preferably metal. The elements 16 and 17 are assembled by tightly disposing the inner periphery of the support element 17 in a perimetric groove 18 in the resilient element 16. If desired, a suitable cement may be provided in the groove 18 to adhere the rigid element 17 to resilient element 16.

The maximum diameter A of the support element 17 is, with close tolerance, substantially equal to the diameter of the annular cavity 11 so that when installed therein in the manner shown in FIG. 1, the seal element 16 is centered simultaneously with respect to the annular cavity 11, the cavity 9 and the cylindrical member 8.

In order to provide for passage of fluid under pressure from cavity 9 through annular cavity 11 to the face of the piston of the rod and piston assembly 5, the perimeter of the support element 17 may be of circular configuration with grooves therein or with ports provided through the support element body. However, the perimeter of the support element 17 is preferably non-circular to provide a fluid passage between the support element perimeter and wall 14 of the annular cavity 11. Preferably, for ease of manufacture, positive centering and sizable fluid passages, as shown in FIG. 3, the perimeter is polygonal, comprising a series of flat sides 19 which are preferably of equal length and of a sufficient number illustratively shown as six, so that rotation of the seal member 7 about its axis during operation of the cylinder device will assure that one or more of the fluid passages bounded by the wall 14 of annular cavity 11 and the flat sides 19, or portions thereof, will always be coincident with the space between the spaced ends, not shown, of the aforementioned conventional snap ring 13 to facilitate passage of fluid around the support element 17 into the cylinder bore.

Referring now to the resilient seal element 16 of cushion seal member 8, it will be observed in FIG. 1 that the outside diameter thereof is somewhat less than the inside diameter of the snap ring 13 so that upon axial movement of cushion seal member 7 toward the snap ring, the seal element 16 extends with clearance through the snap ring, as shown in cylinder head 3, and the support element 17 engages the snap ring, thus providing a metal to metal contact between the cushion seal member 7 and the snap ring to the elimination of any wear upon the resilient seal member 16.

In order to assure a tight seal between the seal element 16 and the wall 12 of annular cavity 11 when the cushion seal member 7 is in abutting engagement therewith, as shown in cylinder head 4 in FIG. 1, one end face 20 of the resilient seal element is flat.

In order to provide a tight seal between the seal element 16 and the cylindrical member 8, and to effect axial movement of the cushion seal member 7 into tight sealing engagement with groove wall 12 immediately upon engagement of the resilient seal element 16 thereby, the opening through annular seal element 16 formed by the inner periphery thereof is axially tapered, the larger end of the opening having a diameter B coincident with end face 20 and the smaller end of the opening having a diameter C coincident with the opposite end face 21. The diameter B of seal element 16 is substantially equal to or slightly less than the outside diameter D of cylindrical member 8 shown in FIG. 1, so as to effect a sealing relationship between diameters B and D when the cylindrical member 8 extends through seal element 16. The smaller diameter C of seal element 16 is greater than the smaller diameter E of chamfered end 22 of cylindrical member 8 to assure positive insertion of the chamfered end 22 within seal element 16 at the approach of the cylindrical member at the end of a piston stroke, and which diameter C is substantially less than the aforementioned diameter D of cylindrical member 8 to effect a positive seal between the seal element 16 and cylindrical member 8 at a perimetric line on the chamfered end 22 somewhere between diameters D and E so that upon initial engagement of the chamfered end 22 with the seal element 16 at diameter C, the seal member 7 immediately moves axially with the cylindrical member until the flat face 20 sealingly engages cavity wall 12, whereupon continued movement of the cylindrical member into cavity 9 effects a resilient expansion of the diameter C to tightly grip the cylindrical member in the position shown in cylinder head 4.

In order to better facilitate the aforementioned expansion of diameter C of seal element 16, the aforementioned end face 21 is axially sloped to provide an acute angle F between the end face 21 and the tapered inner periphery of seal element 16, which angular relationship forms an integral, axially extending, relatively thinner annular lip portion 23 having a relatively greater flexibility than the remainder of the seal element 16.

When the cylindrical member 8 is being withdrawn from the cavities 9 and 11 at the beginning of the return stroke in response to pressure supplied through port 10 in the cylinder head 4, the aforementioned tight sealing relationship between the cylindrical member 8 and seal element 16 effects movement of the cushion seal member 7 axially away from wall 12 in cavity 11 to break the aforementioned seal therebetween allowing fluid under pressure to flow through cavities 9 and 11 around the perimeter of the rigid support element 17, in the manner previously described, past the snap ring 13 and into the cylinder bore for acting upon the face of rod and piston assembly 5. When the support element 17 engages the snap ring 13 during this action, the cylindrical member 8 is withdrawn from seal element 16 as the rod and piston assembly 5 moves toward the opposite end of the cylinder.

Having now described the invention, what I claim as new and desire to secure by Letters Patent is:

1. In a power cylinder device having a cylinder head in which is formed a combined supply and exhaust cylindrical cavity adapted to reciprocably receive therein with radial clearance a cylindrical member movable with and axially extending relative to the piston of a rod and piston assembly, in combination:
- (a) an annular groove disposed in said cylinder head coaxially with and adjacent to the opening of said cavity, said annular groove being defined by a pair of spaced apart end walls radially disposed with respect to the wall of said cavity and joined by a cylindrical surface constituting the bottom of said groove,
- (b) a two-piece seal member disposed in said groove for axial movement with respect to said cavity, between the limits defined by said spaced apart walls,
- (c) said two-piece seal member comprising:
    - (i) an annular resilient seal element having an inner periphery being proportioned for sealing engagement with the periphery of said cylindrical member upon insertion of said cylindrical member therein during travel of the cylindrical member into said cavity and having an outer diameter smaller than that of said groove and larger than that of said cavity for effecting sealing engagement of one end face of said seal member with the inner one of said spaced apart end walls to trap air ahead of the said piston, and
    - (ii) a rigid annular support element concentrically attached to the outer periphery of said annular seal element and having at least portions of its outer perimeter disposed in close tolerance relationship with said connecting wall of said groove to dispose said annular element substantially coaxially with the path of movement of said cylindrical member on said piston;
- (d) passage means defined by a cooperative relationship between said rigid element, said cylindrical surface of said groove and the other of said pair of radially disposed end walls nearest the cylinder to pass fluid under pressure from said cavity to said cylinder in response to fluid pressure in said cavity applied to said cylindrical member and said seal member effecting withdrawal of said cylindrical member from said cavity and movement of said seal element away from sealing engagement with said one end wall of said groove and into engagement with the said other of said end walls of said groove, and
- (e) the opening for receiving said cylindrical member defined by the said other end wall is larger than the outer diameter of said annular resilient seal element whereby upon said withdrawal of said cylindrical member, only the rigid element of said seal member engages said other one of said pair of end walls of said groove.

2. A power cylinder device as recited in claim 1 in which
- (a) said passage means is defined by the said cylindrical surface of said groove, the configuration of the perimeter of said rigid element and the configuration of said other one of said end walls of said groove, wherein
    - (i) said other one of said walls includes passage means therethrough, and
    - (ii) said perimeter of said rigid element is of such configuration so as to provide fluid passage around the seal member coincident with said passage means in said other end wall, for all rotative positions of said seal member.

3. A power cylinder device as recited in claim 2 in which said perimeter of said rigid element is non-circular.

4. A power cylinder device as recited in claim 2 in which said perimeter of said rigid element is polygonal.

5. A power cylinder device as recited in claim 2 in which said groove comprises in combination
- (a) a counterbore of said cavity and having a bottom forming said one wall, and
- (b) a snap ring disposed in said counterbore in parallel spaced relation with said bottom of said counterbore and forming said other one of said walls, and with the spaced ends of said snap ring defining said passage means through said other one of said walls.

6. A power cylinder device as recited in claim 1 in which
- (a) the end of said cylindrical member is chamfered to form an end portion having a diameter smaller than the diameter of the remaining portion of said cylindrical member,
- (b) the inner periphery of said seal element forms an opening axially tapered inwardly in a direction toward said other one of said walls, the smaller end of said tapered opening having a diameter greater than said end diameter and smaller than said diameter of the remaining portion of said cylindrical member and effecting a seal between said seal element on a perimetric line on said chamfered end disposed between said end diameter and said remaining diameter of said cylindrical member immediately upon insertion of the said chamfered end in said tapered opening of said seal element and to effect immediate axial movement of said seal element, under the urging of the forward motion of said chamfered end, into tight sealing engagement with said one wall of said groove, and to effect immediate reverse axial movement of said seal element away from said one end wall in response to initial withdrawal of said cylindrical member from said cavity.

7. A power cylinder device as recited in claim 1 in which said configuration of said rigid element comprises a polygonal outer periphery having a maximum diameter substantially equal to the diameter of the groove to effect a close tolerance fit.

References Cited
UNITED STATES PATENTS

| | | | |
|---|---|---|---|
| RE 24,532 | 9/1958 | Halladay et al. | 91—26 |
| 980,671 | 1/1911 | Price | 27—235 |
| 2,309,446 | 1/1943 | Ekkebus | 277—178 X |
| 2,493,602 | 1/1950 | Sterrett | 91—396 |
| 2,710,595 | 6/1955 | Peterson et al. | 91—26 |
| 2,853,974 | 9/1958 | Hewitt | 91—26 |
| 2,884,903 | 5/1959 | Pauly | 91—26 |
| 2,935,047 | 5/1960 | Ortman et al. | 91—396 |
| 2,958,551 | 11/1960 | Rogers | 308—36.1 |
| 3,005,648 | 10/1961 | Christensen | 277—178 |
| 3,267,815 | 8/1966 | Ortman et al. | 92—85 X |
| 2,484,102 | 10/1949 | Valley | 251—167 |
| 3,093,153 | 6/1963 | Horowitz | 251—358 X |

FOREIGN PATENTS
714,881   8/1965   Canada.

MARTIN P. SCHWADRON, *Primary Examiner.*

IRWIN C. COHEN, *Assistant Examiner.*

U.S. Cl. X.R.

91—26; 92—85; 277—178